United States Patent
Li et al.

(10) Patent No.: US 10,523,500 B2
(45) Date of Patent: Dec. 31, 2019

(54) METHOD AND SYSTEM FOR AUTOMATICALLY CONFIGURING FANOUT MODE OF A NETWORK SWITCH PORT IN AN INTERCONNECTED NETWORK

(71) Applicant: QUANTA COMPUTER INC., Taoyuan (TW)

(72) Inventors: Cheng-Hsun Li, Taoyuan (TW); Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 60 days.

(21) Appl. No.: 15/891,016

(22) Filed: Feb. 7, 2018

(65) Prior Publication Data

US 2019/0097878 A1 Mar. 28, 2019

Related U.S. Application Data

(60) Provisional application No. 62/563,376, filed on Sep. 26, 2017.

(51) Int. Cl.
| | |
|---|---|
| H04L 12/24 | (2006.01) |
| G06F 13/40 | (2006.01) |
| G06F 13/42 | (2006.01) |
| H04L 12/751 | (2013.01) |

(52) U.S. Cl.
CPC ...... *H04L 41/0803* (2013.01); *G06F 13/4022* (2013.01); *G06F 13/42* (2013.01); *H04L 41/083* (2013.01); *H04L 41/0886* (2013.01); *H04L 41/0896* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 8,893,125 B2 | 11/2014 | Shah | |
| 2012/0328239 A1 | 12/2012 | Fuerst et al. | |
| 2013/0148511 A1 | 6/2013 | Banga et al. | |
| 2014/0016637 A1* | 1/2014 | Masood | H04L 12/4013 370/390 |
| 2016/0192044 A1* | 6/2016 | Raza | G02B 6/3885 398/49 |
| 2018/0048712 A1* | 2/2018 | Sarisky | H04L 67/1097 |

FOREIGN PATENT DOCUMENTS

| | | |
|---|---|---|
| WO | 2016053979 A2 | 4/2016 |
| WO | 2016164769 A1 | 10/2016 |

OTHER PUBLICATIONS

Extended European Search Report for EP Application No. 18176958.9, dated Sep. 4, 2018.
TW Office Action for Application No. 107116429, dated Oct. 19, 2018, w/ First Office Action Summary.
TW Search Report for Application No. 107116429, dated Oct. 19, 2018, w/ First Office Action.

* cited by examiner

*Primary Examiner* — Saumit Shah
(74) *Attorney, Agent, or Firm* — Nixon Peabody LLP; Zhou Lu

(57) ABSTRACT

What is disclosed is a system and method to automatically configure the fanout modes of ports of a switch in a network system. The network node coupled to the port of the network switch is discovered. A plurality of fanout modes for the port is determined. The port is configured with one of the plurality of fanout modes. The system may also use neighboring ports to determine the maximum speed of a network interface card of the network node.

13 Claims, 5 Drawing Sheets

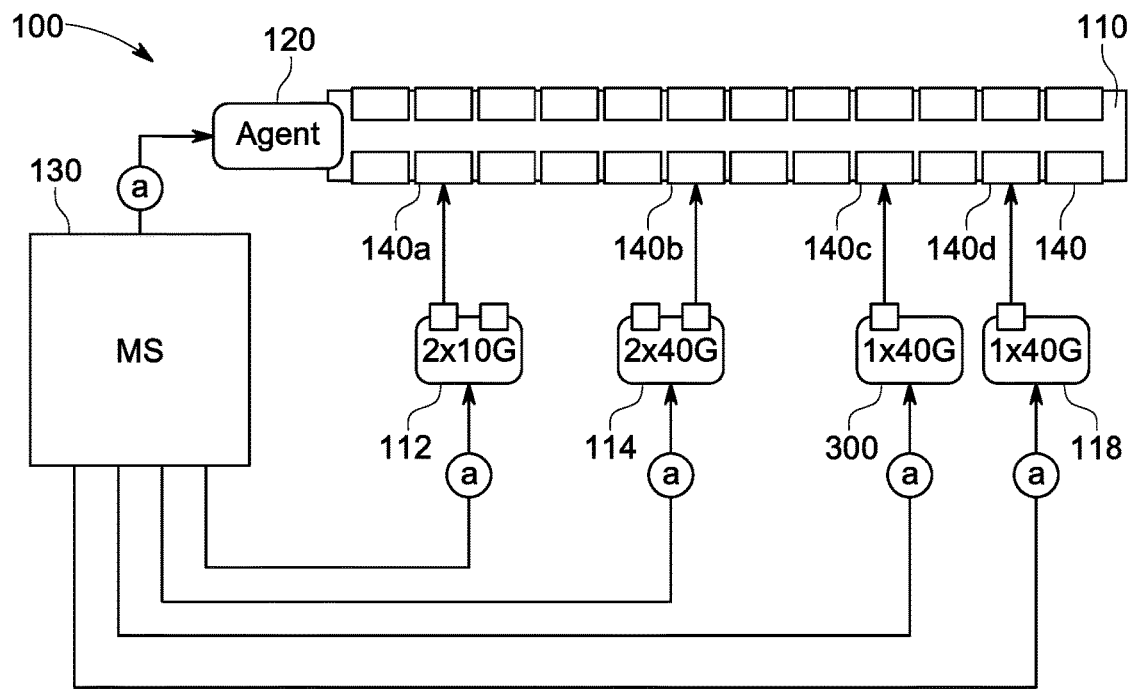

| Port | Name | Status | Vlan | Duplex | Speed | Type |
|---|---|---|---|---|---|---|
| Gi1/1 | | not connect | 1 | auto | auto | No Gbic |
| Gi1/2 | | not connect | 1 | auto | auto | No Gbic |
| Gi5/1 | | not connect | 1 | auto | auto | 10/100/1000-TX |
| Gi5/2 | | not connect | 1 | auto | auto | 10/100/1000-TX |
| Gi5/3 | | not connect | 1 | auto | auto | 10/100/1000-TX |
| Gi5/4 | | not connect | 1 | auto | auto | 10/100/1000-TX |
| Fa6/1 | | connected | 1 | a-full | a-100 | 10/100BaseTX |
| Fa6/2 | | connected | 2 | a-full | a-100 | 10/100BaseTX |
| Fa6/3 | | not connect | 1 | auto | auto | 10/100BaseTX |
| Fa6/4 | | not connect | 1 | auto | auto | 10/100BaseTX |

Switch#show interfaces status

METHOD AND SYSTEM FOR AUTOMATICALLY CONFIGURING FANOUT MODE OF A NETWORK SWITCH PORT IN AN INTERCONNECTED NETWORK

PRIORITY CLAIM

The present application claims priority to U.S. Provisional Application No. 62/563,376 filed on Sep. 26, 2017. The entirety of that application is hereby incorporated by reference.

TECHNICAL FIELD

The present disclosure relates generally to efficient use of different connectors. More particularly, aspects of this disclosure relate to a system of automatically configuring a fanout mode of a switch port.

BACKGROUND

The emergence of the cloud for computing applications has increased the demand for off-site installations, known as data centers, that store data and run applications accessed by remotely connected computer device users. Such data centers typically have massive numbers of servers, switches and storage devices to store and manage data. A typical data center has physical rack structures with attendant power and communication connections. The racks are arranged in rows throughout the room or rooms of the data center. In general, each rack has one or more switches with ports that are configured for certain connection speeds for multiple servers that reside in the rack.

Different servers may have different connection speeds. However, such different servers may be present in one rack, and thus the rack equipment must be configured to handle different speed connections. For example, high speed Ethernet data communication has been commonly used in data centers. However, the data communication for Ethernet may include speeds such as 1 Gbit/s, 10 Gbit/s, 14 Gbit/s and 28 Gbit/s. In order to efficiently use devices that have slower connection speeds, transmission channels may be combined to take advantage of a high connection speed port on a network switch. For example, four 10 Gbit/s transmission channels may be combined to achieve 40 Gbit/s Ethernet physical transmission rate. Similarly, four 28 Gbit/s transmission channels may be combined to achieve 100 Gbit/s Ethernet physical transmission.

Thus, it is common in Ethernet switches to support a fanout mode for the ports of the switch. A fanout mode allows lower transmission rate channels to be combined to take advantage of a higher transmission rate in a switch port. For example, switch and router manufacturers allow for the use of a single quad-port as four independent single ports to greatly increase port density. FIG. 1 shows an example of an interconnected network 100, including a switch 12 and systems 14 and 16. The systems 14 and 16 represent different configurations of network devices such as servers. In this example, the switch 12 has ports 20 that are 40 Gbit/s ports. Other ports represent separate fanout 10 Gbit/s ports from a single 40 Gbit/s port. For example, a quad small form pluggable (QSFP) transceiver may be inserted in a single 40 Gbit/s port. The transceiver has four 10 Gbit/s connections that function as the equivalent of four 10 Gbit/s ports. Thus, one or more of the 40 Gbit/s ports 20 are fanned out to four 10 Gbit/s ports such as the ports 22a, 22b, 22c and 22d. In this example, some systems such as the system 14 have two 10 Gbit/s ports connecting to two ports 22b and 22d of one of the 40 Gbit/s ports in 4×10 Gbit/s fanout mode. Some systems such as the system 16 have a single 40 Gbit/s port connecting to the port 20 in a 1×40 Gbit/s fanout mode A cluster of servers, such as those in a rack, typically communicate to each other by connections of Ethernet cables from network interface cards (NICs) on the servers to ports on the Ethernet switch. The implication of fanout support of an Ethernet switch, such as the switch 12, is that a network administrator has more flexibility to choose different speeds of network components in relation to respective NICs for a cluster of servers connected to the Ethernet switch. For maximum efficiency, it is desirable for all ports of an Ethernet switch to be utilized fully and therefore avoid unused ports. Therefore, a network administrator typically wishes to ensure the fanout configuration of an Ethernet switch port is correct each time the network topology changes. For example, initially most servers may be equipped with 10 Gbit/s NICs. In such a case, ports of Ethernet switches that support a 4×10 Gbit/s fanout mode or 1×40 Gbit/s fanout mode are configured for the 4×10 Gbit/s fanout mode to accommodate the servers that have 10 Gbit/s NICs. Often equipment is upgraded to achieve higher communication speeds. Thus, the group of servers may be changed to servers having NICs with 40 Gbit/s speed for high bandwidth applications. In this situation, the network administrator has to ensure all corresponding fanout configurations of the ports are correct for the Ethernet switch. The previous port would have to be configured for the 1×40 Gbit/s fanout mode to accommodate the new server with a 40 Gbit/s NIC. Ensuring the corresponding fanout configuration matches the new requirements takes time for the network administrator to accomplish.

Another issue is determining the speed of different NICs of nodes in a network. Currently, a generic method to learn operating speeds of NICs relies on protocols of known operating systems such as Linux or Microsoft Windows. However, the current methods are undesirable because they cause delays in determining the speed of the NICs.

Thus, there is a need for a network system that can automatically incorporate different speed network connections through configuring fanout modes for a network switch. There is a further need for a system that allows detection and determination of the operating speed of NICs based on neighborhood information from network nodes. There is also a need for a system that allows the fanout mode of ports for new network nodes to be readily configured and stored for management purposes.

SUMMARY

One disclosed example is a method of determining a fanout configuration of a port of network switch coupled to a network node. The network node coupled to the port of the network switch is discovered. A plurality of fanout modes for the port is determined. The port is configured with one of the plurality of fanout modes.

Another example is a method to determine the operating speed of a network interface card of a network node coupled to a first port of a network switch. The operating speed of the network interface card of the network node is stored. A network interface card identity is retrieved from a second network node coupled to a second port of the network switch. The second network node is a neighbor of the network node. The identity of the network interface card of the network is matched with neighbor information of the second network node. The operating speed of the network node is retrieved based on the matched identity.

Another example is a network system. The network system has a switch having a port having a plurality of fanout modes. A network node is coupled to the port. A switch agent is operable to periodically determine the fanout modes of the port and configure the port for one of the fanout modes.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 3 shows a block diagram of the network system in FIG. 2 with a different node that requires automatic configuration of the fanout mode of one of the ports;

FIG. 4 is a table detailing switch port data for a network switch compiled by the management node in FIG. 1;

Figure 1:
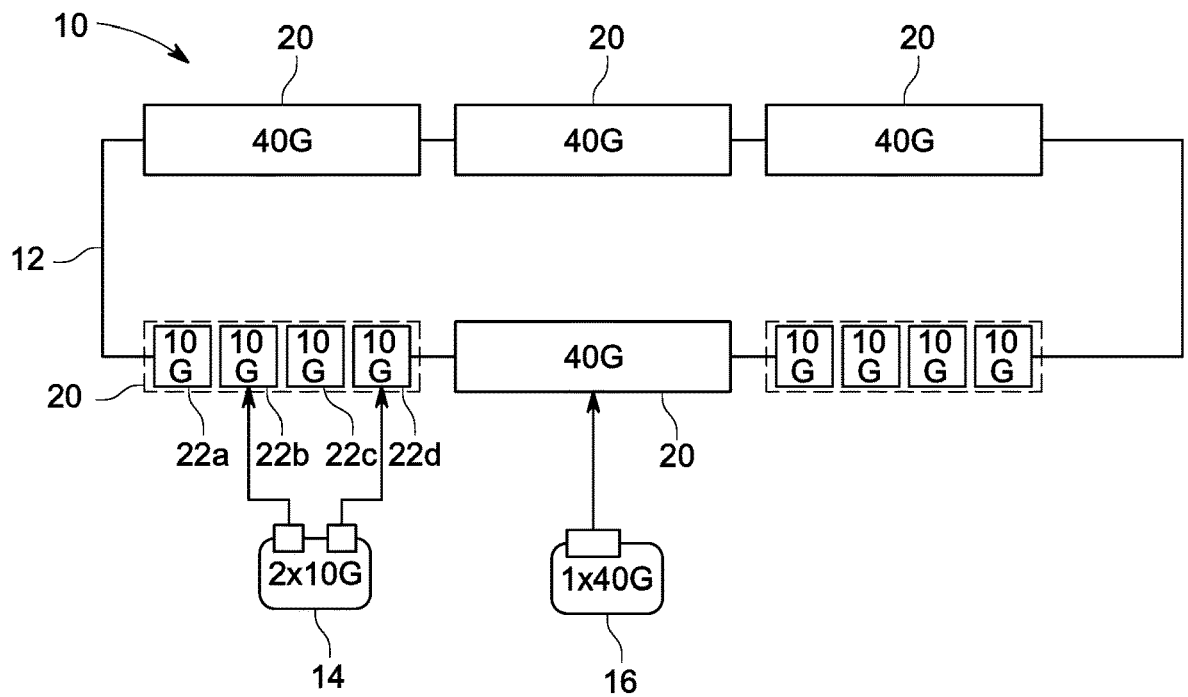
FIG. 1 shows a prior art Ethernet switch system having systems with different speed NICs connected to ports configured for different fanout modes.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Figure 2:
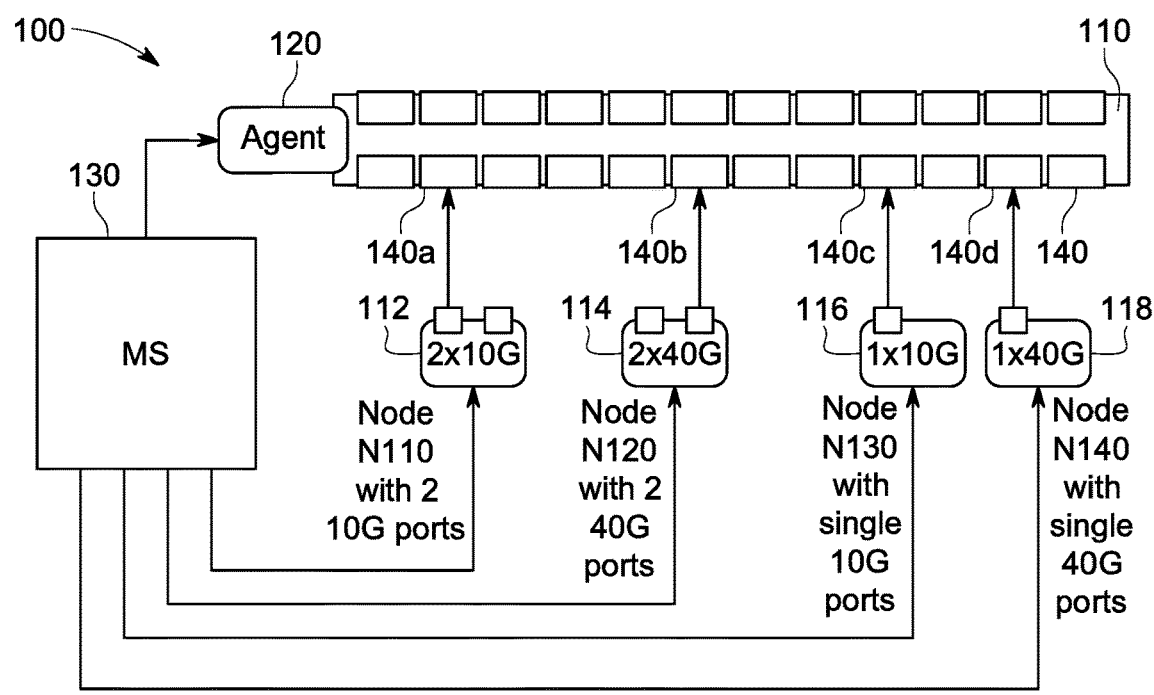
FIG. 2 shows a network system including a switch with ports having different fanout modes for different networked nodes.

FIG. 2 shows an Ethernet switching network system 100 that may be used in a data center. The system 100 includes an Ethernet switch 110 that includes switch ports 140 coupled to nodes 112, 114, 116, and 118. In this example, the node 112 has two 10 Gbit/s ports, the node 114 has two 40 Gbit/s ports, the node 116 has single 10 Gbit/s ports and the node 118 has single 40 Gbit/s ports. The components of each of the nodes 112, 114, 116 and 118 have a network interface card that has a set communication speed. The Ethernet switch 110 has a management agent 120 such as a controller that connects a management port of the Ethernet switch 110 to a management node 130. Alternatively, the agent 120 may be run inside the Ethernet switch 110. Generally, the management node 130 is connected to multiple switches similar to the Ethernet switch 110. The management node 130 is also connected to the corresponding agents of the nodes of those switches.

The system 100 operates to automatically configure the fanout mode for each of the switch ports 140 so that network administrators can be freed from configuring fanout modes manually when nodes having NICs of different speeds are added or replacing existing nodes in the interconnected Ethernet network system 100. The procedure also allows systems or severs to utilize the link speed of Ethernet switch ports of neighborhood information to derive what operating speed of a specific NIC.

In this example, one port 140a of the switch 110 is connected to the node 112 and is a 40 Gbit/s port that is configured in 4×10 Gbit/s fanout mode. The node 112 has two 10 Gbit/s ports that are connected to the port 140a. A second port 140b is connected to the node 114 and is a 40 Gbit/s port that is configured in 1×40 Gbit/s fanout mode. In this example, the node 114 has two 40 Gbit/s ports, and one of those ports is connected to the port 140b. A third port 140c is connected to the node 116 and is a 40 Gbit/s port that is configured in 4×10 Gbit/s fanout mode. The node 116 has 10 Gbit/s ports that may be connected to the port 140c in the fanout mode. A fourth port 140d is connected to the node 118 and is a 40 Gbit/s port that is configured in 1×40 Gbit/s fanout mode.

Management software may reside on a network management controller, such as the management node 130, to manage network resources/nodes such as the Ethernet switch 110 and the nodes 112, 114, 116, and 118. The management software on the management node 130 may send commands to management agents to control different nodes such as the node 112 in an interconnected network environment such as the system 100.

In this example, the nodes 112, 114, 116, and 118 each include computer systems and Ethernet switches to form an interconnected network. Each node 112, 114, 116, and 118 has a management agent that behaves as a controller to issue different commands inside the nodes. For example, a system/server agent can be a baseboard management controller so that the management software in the management node 130 can send commands to the system/server agent to power on/off the system.

An Ethernet switch agent such as the agent 120 may be inside the switch 110 to configure the switch directly as shown in FIG. 2, or outside the switch 110 to configure the switch 110 via connections such as an RJ45, I2C, Ethernet or other communication protocol connector. The system/server nodes such as the nodes 112, 114, 116, and 118 each have NIC ports connected to a network switch or switches, such as the Ethernet switch 120, with cables.

The management software in the management node 130 sends a signal to agents of systems and switches such as the nodes 112, 114, 116, and 118 to start a provision/checking session. The management software may deploy any existing mechanism to discover and provision neighbor relationships between the ports for all nodes in the interconnected network. Well-known existing mechanisms include but are not limited to the Cisco Discovery Protocol (CDP) and the Link Layer Discovery Protocol (LLDP). Messages according to LLDP are characterized by the fact that the packet scope is limited to the link which exists between the switch port of the switch 110 and the agent of the connected network node. The LLDP to a particular network node is not forwarded to nodes connected to other ports of the switch 110. A known example of interconnected management framework is the Intel Rack Scale Design (Intel RSD). A rack solution conforming to Intel RSD could use either the CDP or LLDP discovery protocol to determine neighbor relationships and thus provide the network topology of the network nodes.

An example of such a response to the Ethernet switch 110 from the management node 130 for a switch port and a neighboring port is shown in the code below. The code below shows real queried data from an Intel RSD management framework via HTTP access, in which the data (neighbor information) is already discovered and stored, and is presented in JSON data format.

In this example, the request is a redfish request to obtain information relating to one of the ports on the switch 110. The response includes different data relating to the port such as the status, link type and operational status, as well as information relating to a neighbor port such as the MAC address of the neighbor port. Thus, the request provides information on the port as well as information for the neighbor port. After obtaining the data corresponding to each of the ports for each of the network nodes, the network topology may be provided. The management software can obtain basic information from the NIC of the system node in the same redfish form. The below is an example of such a request and response.

```
Request:
GET /redfish/v1/Systems/System1/EthernetInterfaces/LAN1
Content-Type: application/json
Response:
{
    "@odata.context":
"/redfish/v1/$metadata#EthernetInterface.EthernetInterface",
    "@odata.id":
"/redfish/v1/Systems/System1/EthernetInterfaces/LAN1",
    "@odata.type": "#EthernetInterface.v1_1_0.EthernetInterface",
    "Id": "LAN1",
    "Name": "Ethernet Interface",
    "Description": "System NIC 1",
    "Status": {
        "State": "Enabled",
        "Health": "OK",
        "HealthRollup": null
    },
    "InterfaceEnabled": true,
    "MACAddress": "AA:BB:CC:DD:EE:FF",
    "SpeedMbps":?,
    "AutoNeg": true,
```

```
Request:
GET /redfish/v1/EthernetSwitches/Switch1/Ports/Port1
Content-Type: application/json
Response:
{
    "@odata.context":
"/redfish/v1/$metadata#EthernetSwitches/Members/1/Ports/Members/1/$entity",
    "@odata.id": "/redfish/v1/EthernetSwitches/1/Ports/1",
    "@odata.type": "#EthernetSwitchPort.v1_0_0.EthernetSwitchPort",
    "Id": "Port1",
    "Name": "Switch Port",
    "Description": "description-as-string",
    "PortId": "sw0p10",
    "Status": {
        "State": "Enabled",
        "Health": "OK",
        "HealthRollup": "OK"
    },
    "LinkType": "Ethernet",
    "OperationalState": "Up",
    "AdministrativeState": "Up",
    "LinkSpeedMbps": 10000,
    "NeighborInfo": {
        "SwitchId": "sw2",
        "PortId": "11",
        "CableId": "CustomerWritableThing"
    },
    "NeighborMAC": "00:11:22:33:44:55",
    "FrameSize": 1518,
    "Autosense": true,
    "FullDuplex": true,
    "MACAddress": "2c:60:0c:72:e6:33",
    "IPv4Addresses": [{
```

-continued

```
"FullDuplex": true,
"MTUSize": 1500,
"HostName": "web483",
```

In this example, the "SpeedMbps" value cannot be known by querying agent of system node (e.g., a board management controller), so that management software can match the NIC "MACAddress" to the "NeighborMAC" of the Ethernet switch port. If there is a match, then the link speed of the port is be used as the speed of the NIC (i.e. "SpeedMbps").

Requests may be used to retrieve the neighbor MAC address or neighbor information of a corresponding port. The below request and response show a request for the MAC address information of a network interface card from the Ethernet switch 110 to one of the nodes. The below response show that requests may be used to retrieve the neighbor MAC addresses of a corresponding port:

```
Request:
GET /redfish/v1/Systems/System1/EthernetInterfaces/LAN1
Content-Type: application/json
Response:
{
    "@odata.context":
    "/redfish/v1/$metadata#EthernetInterface.EthernetInterface",
    "@odata.id":
    "/redfish/v1/Systems/System1/EthernetInterfaces/LAN1",
    "@odata.type": "#EthernetInterface.v1_1_0.EthernetInterface",
    "Id": "LAN1",
    "Name": "Ethernet Interface",
    "Description": "System NIC 1",
    "Status": {
        "State": "Enabled",
        "Health": "OK",
        "HealthRollup": null
    },
    "InterfaceEnabled": true,
    "PermanentMACAddress": "AA:BB:CC:DD:EE:FF",
    "MACAddress": "AA:BB:CC:DD:EE:FF",
    "SpeedMbps": 100,
    "AutoNeg": true,
    "FullDuplex": true,
    "MTUSize": 1500,
    "HostName": "web483",
```

In this example, the agents of the network nodes are baseboard management controllers. Thus, when an agent of the system 100 (such as the agent for the Ethernet switch 110 or the agents for the nodes 112, 114, 116, or 118) receives a provisioning signal from the management software, the agent powers on the corresponding system. For example, a CPU may be powered on and run with BIOS firmware and the corresponding NIC is brought up to normal operating mode by corresponding baseboard management controller on receiving the signal from the management node 130. The management software may perform various routines to automatically configure the network based on information received from the various nodes via discovery and provision communications as explained above.

An example of one such routine may be to configure each switch port of a switch to an appropriate fanout mode. In this routine, when an agent of an Ethernet switch such as the agent 120 in FIG. 2 receives a provisioning signal from the management software running on the management node 130, the agent 120 repeats the following routine periodically to refresh the fanout modes of the ports connected to the nodes of the system such as the nodes 112, 114, 116, and 118 in FIG. 2.

First, the agent 120 picks up the Ethernet switch ports on the Ethernet switch 110 one by one until all the ports are examined. In doing so, the agent sends a command/signal to the Ethernet switch 110 to get a response of how many ports it should enumerate/check in each loop. Second, the agent 120 gets the fanout supported mode of a particular port by sending a command/signal to the Ethernet switch 110 and receive a response of the supported fanout modes. The supported fanout mode is also termed the port mode. For example, different port fanout modes may include a 1×100 Gbit/s fanout mode or a 4×25 Gbit/s fanout mode for a 100 Gbit/s port. Another example may be a 1×40 Gbit/s fanout mode or a 4×10 Gbit/s fanout mode for a 40 Gbit/s port. In this example, the switch port 140a connected to the node 112 has a 4×10 Gbit/s fanout mode; the switch port 140b connected to the node 114 has a 2×40 Gbit/s fanout mode; the switch port 140c connected to the node 116 has a 4×10 Gbit/s fanout mode; and the switch port 140d connected to the node 118 has a 1×40 Gbit/s fanout mode.

The agent 120 then configures the supported fanout mode one by one for each of the switch ports. For example, the agent 120 would configure the 1×100 Gbit/s ports; then configure the 4×25 Gbit/s ports; then configure the 1×40 Gbit/s ports; and finally configure the 4×10 Gbit/s ports. When a fanout mode is configured for one switch port, the agent 120 will continue to configure the fanout mode of the next port switch. The decision is based on checking the link status of the port. If the link status is up or on, then the agent exits the configuration process and keeps the fanout mode as the detected fanout mode. The fanout mode is then recorded in volatile or non-volatile storage for that port. The agent 120 then proceeds to examine the next port switch. If the link status of the node is down or off, the agent will continue to configure the fanout mode of the next switch port.

Thus, the system allows the NICs of the systems/servers of the network nodes to be equipped for different speeds as the requirement of applications. Every time a node and corresponding NIC is changed, network administrators may keep a record of the NIC for maintenance and management purposes. FIG. 3 shows the system 100 in FIG. 2, with a new node 300 added in place of the node 116. Like elements in FIG. 3 are labeled with like reference numbers as their counterparts in FIG. 2. The new node 300 has a NIC that operates at 40 Gbit/s instead of the single 10 Gbit/s speed of the node 116. As explained above, the management node 130 will discover the new speed of the node 300 and automatically configure the corresponding port of the switch 110 to the new 40 Gbit/s port mode.

FIG. 4 shows a table 400 of port link status information. The information in table 400 is compiled by the management software running on the management node 130 in FIG. 2 by the process described above. The port link status table 400 includes a port name column 410, a status column 412, a VLAN number column 414, a duplex column 416, a speed column 418 and a type column 420. The port name column 410 has fields with the port name of each of the detected ports. The status column 412 includes a status of either connected or not connected for each of the ports. The VLAN column 414 includes the VLAN the port is connected to. The duplex column 416 includes data on whether the port is on auto or in full duplex mode. The speed column 418 includes the speed mode that the port is currently running e.g., 10 Gbits/s, 25 Gbits/s, 40 Gbits/s, 100 Gbits/s. The type column 420 is the type of network cable currently used.

Another routine run by the agent 120 may be to obtain the operating speed of the NICs of the nodes of the system 100 in FIG. 2. In parallel with the configure fanout mode routine described above, the agent 120 may run the following routine periodically to record the maximum speed value of the current ports. This routine records the speed value for later usage such as assisting in selecting systems with certain NCI speed requirements.

The agent 120 picks up the switch ports of the Ethernet switch 110 one by one until the agent 120 receives a session/checking stop signal from the management software on the management node 130. For each of the switch ports, the agent 120 retrieves the port speed of the enumerating port and compares this speed value ($Speed_{current}$) to the speed value of last enumeration ($Speed_{last}$). The port speed is retrieved from the port. If $Speed_{current}$ is larger than $Speed_{last}$, the agent 120 updates $Speed_{last}$ as $Speed_{current}$. In this manner the port speeds are updated to reflect the detected speed on each port during current operation.

The agent 120 continues to the next enumeration port and repeats the process of retrieving the port speed and comparing the port speed to the value of the last enumeration. When the agent 120 detects that the current port is the last port, the agent 120 repeats the process to ensure that updated speed information for all of the ports is obtained. This routine is repeated until a session stop signal is received from the management node 130.

When the agent 120 receives a request or demand to determine the operating port speed of the NIC of a system node, the management node 130 performs the following operation. Such a demand may occur in upper application scenarios such as a situation where one application wants to find certain system nodes with specific NIC speed requirements via the management software. The management software may use the routine below to derive the NIC speed of system node. The management software on the management node 130 may retrieve the identity of the network interface card from the system agent 120. The identity of the NIC may be the MAC address of the node such as the node 112 in FIG. 2. The MAC address may be retrieved via the request and response outlined in the example code above. The information from the Ethernet switch port contains the "Neighbor-MAC" data and the management software may use this value to search for the system node that has a NIC that has the MAC address value. The management software then queries the agents of all switches managed by the management node 130. For example, the agent 120 of the Ethernet switch 110 in FIG. 2 may be queried by the management node 130. The agent 120 matches the port, which has neighbor identity that is the same as the identification of the NIC. As explained above, the request for port attributes results in a response that includes the neighbor MAC address as shown in the code described above. When a match of the MAC address is made to the port, the management software retrieves the last speed data of the port and determines the operating speed of the NIC.

The above procedures leverage the interconnected relationship of the network system to overcome limitations of single nodes. The above routines allow the fanout modes for network switch ports to be automatically confirmed and configured, thereby saving network administrators from performing this task. The routine to provide the operating speed of the network interface cards in the system is useful when managing a large pool of systems such as that found in a data center. With the knowledge of the operating speed of the NICs in a system, resource pool administrators may filter out systems/servers more suitable to the application load to be deployed on the node with respect to network link speed/bandwidth.

Figure 5:
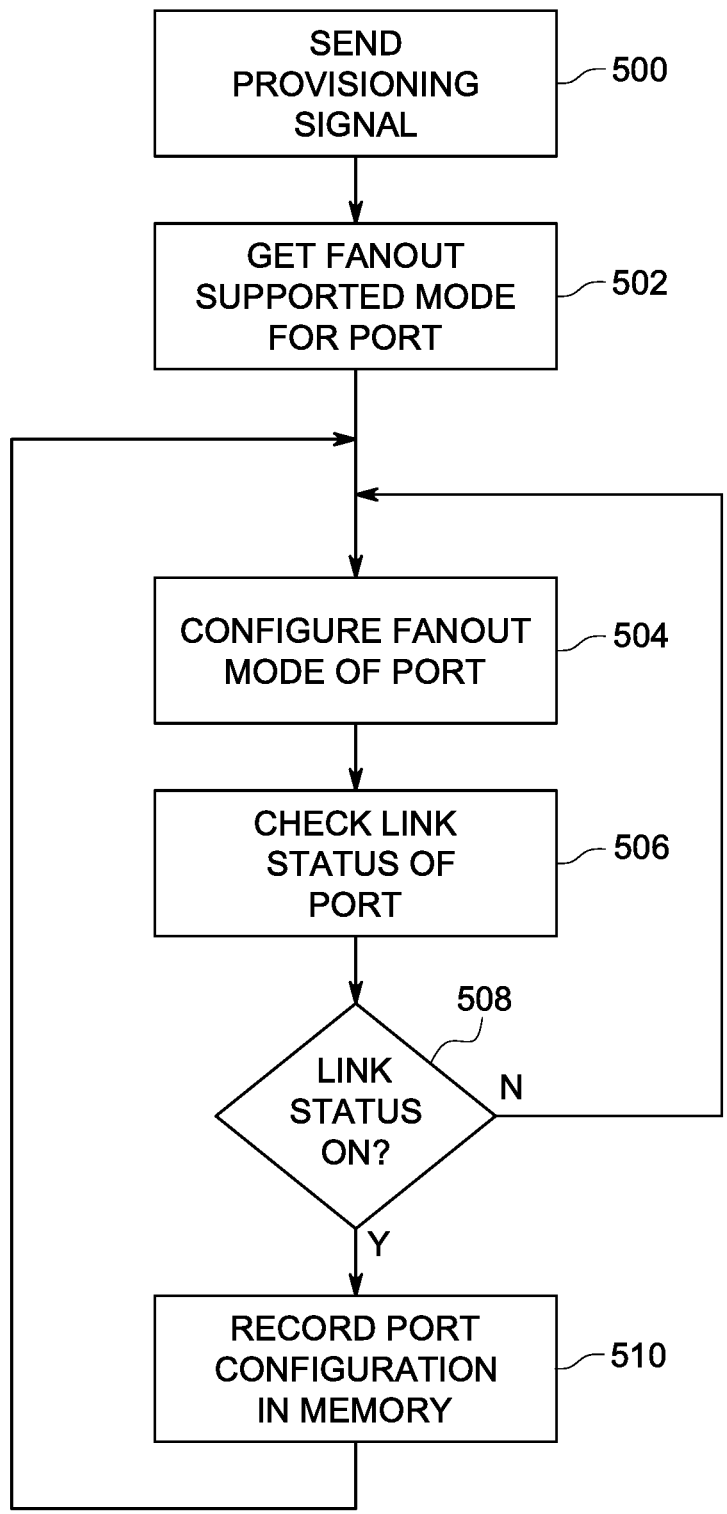
FIG. 5 is a flow diagram of the code executed by the management node in FIG. 1 to automatically detect fanout modes on switch ports.
Figure 6:
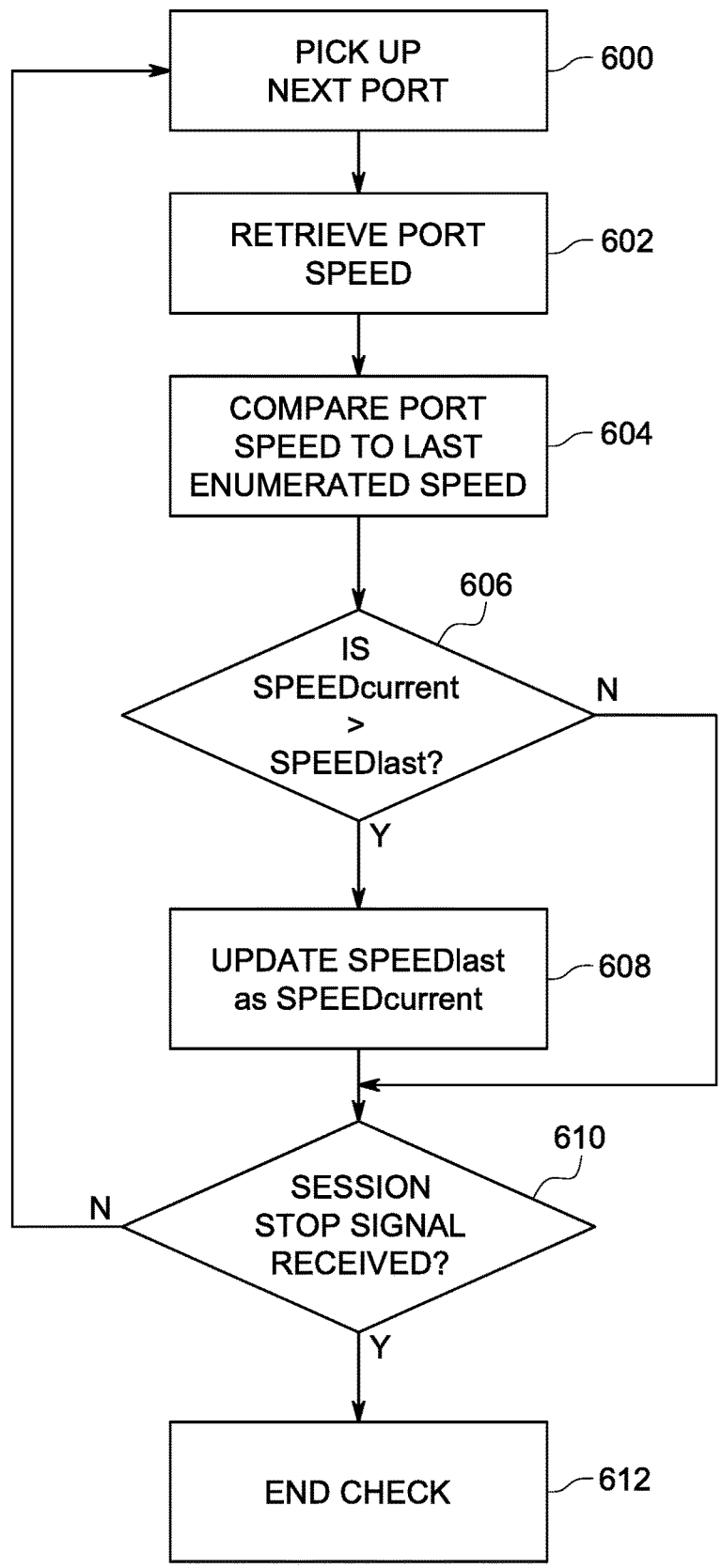
FIG. 6 is a flow diagram of the code executed by management node and switch agent in FIG. 1 to determine speeds of a network interface card on network nodes.

FIG. 5 shows a flow diagram of the code executed by the management node 130 and the switch agent 120 in FIG. 2 to automatically configure the fanout mode of switch ports of the Ethernet switch 110. FIG. 6 shows a flow diagram of the code executed by the management node 130 and the switch agent 120 in FIG. 2 to discover NIC speeds. In this example, the machine readable instructions comprise an algorithm for execution by: (a) a processor, (b) a controller, and/or (c) one or more other suitable processing device(s). The algorithm may be embodied in software stored on tangible media such as, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowcharts of FIGS. 5 and 6 may be implemented manually. Further, although the example algorithm is described with reference to the flowcharts illustrated in FIGS. 5 and 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 5 is a flow diagram of the routine run by the management software to configure the fanout configurations of the ports in the Ethernet switch 110 in FIG. 2. In this example, the management software on the management node 130 sends a provisioning signal to the agent 120 on the Ethernet switch 110 in FIG. 2 (500). The agent 120 starts with the first port of the switch 110 and gets the fanout supported mode for the port (502). The agent 120 then configures the fanout mode of the port (504). The agent 120 then checks the link status of the configured port (506). If the link status of the port is up/on (508), the agent 120 keeps the fanout mode as the detected fanout mode and records the port configuration in memory (510). The agent 120 then proceeds to configure the next switch port (504) and repeats the procedure until each of the switch ports are examined. If the link status of the port is down/off (508), the agent 120 will loop back to configure the fanout mode of the next port (504). In this manner, the fanout modes are automatically configured for each of the switch ports of the Ethernet switch 110.

FIG. 6 is a routine run by the agent 120 of the Ethernet switch 110 in FIG. 2 to record the maximum values of the nodes connected to the ports of the Ethernet switch 110. On receiving a provisioning signal from the management node 130 in FIG. 2, the agent 120 picks up the next port (600). The agent 120 retrieves the port speed from the selected port (602). The agent then compares the retrieved port speed to the last enumerated port speed (604). If the current speed is greater than the last enumerated port speed (606), the agent 120 updates the enumerated port speed with the current port speed (608). The agent 120 then determines whether a session stop signal has been received from the management node 130 (610). If the current speed is not greater than the enumerated speed (606), the agent 120 proceeds to determine whether a session stop signal has been received (610). If no session stop signal is received, the agent 120 proceeds to the next port (600). If a session stop signal is received, the agent 120 ends the routine.

Figure 7:
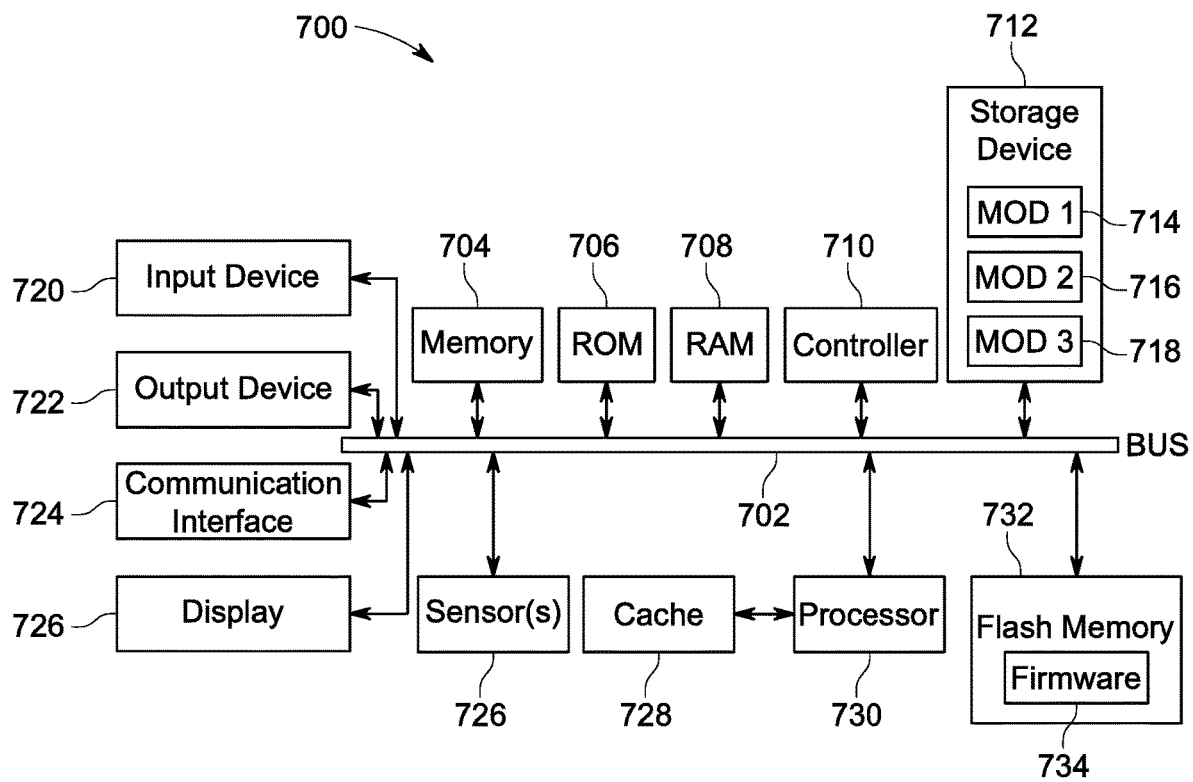
FIGS. 7 and 8 illustrate exemplary systems in accordance with various examples of the present disclosure.

FIG. 7 illustrates an example computing system 700, in which the components of the computing system are in electrical communication with each other using a bus 702. The system 700 includes a processing unit (CPU or processor) 730, and a system bus 702 that couples various system components, including the system memory 704 (e.g., read only memory (ROM) 706 and random access memory (RAM) 708), to the processor 730. The system 700 can include a cache of high-speed memory connected directly with, in close proximity to, or integrated as part of the processor 730. The system 700 can copy data from the memory 704 and/or the storage device 712 to the cache 728 for quick access by the processor 730. In this way, the cache can provide a performance boost for processor 730 while waiting for data. These and other modules can control or be configured to control the processor 730 to perform various actions. Other system memory 704 may be available for use as well. The memory 704 can include multiple different types of memory with different performance characteristics. The processor 730 can include any general purpose processor and a hardware module or software module, such as module 1 714, module 2 716, and module 3 718 embedded in storage device 712. The hardware module or software module is configured to control the processor 730, as well as a special-purpose processor where software instructions are incorporated into the actual processor design. The processor 730 may essentially be a completely self-contained computing system, containing multiple cores or processors, a bus, memory controller, cache, etc. A multi-core processor may be symmetric or asymmetric.

To enable user interaction with the computing device 700, an input device 720 is provided as an input mechanism. The input device 720 can comprise a microphone for speech, a touch-sensitive screen for gesture or graphical input, keyboard, mouse, motion input, and so forth. In some instances, multimodal systems can enable a user to provide multiple types of input to communicate with the system 700. In this example, an output device 722 is also provided. The communications interface 724 can govern and manage the user input and system output.

Storage device 712 can be a non-volatile memory to store data that are accessible by a computer. The storage device 712 can be magnetic cassettes, flash memory cards, solid state memory devices, digital versatile disks, cartridges, random access memories (RAMs) 708, read only memory (ROM) 706, and hybrids thereof.

The controller 710 can be a specialized microcontroller or processor on the system 700, such as a BMC (baseboard management controller). In some cases, the controller 710 can be part of an Intelligent Platform Management Interface (IPMI). Moreover, in some cases, the controller 710 can be embedded on a motherboard or main circuit board of the system 700. The controller 710 can manage the interface between system management software and platform hardware. The controller 710 can also communicate with various system devices and components (internal and/or external), such as controllers or peripheral components, as further described below.

The controller 710 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 710 to initiate or conduct specific hardware recovery procedures or operations, as further described below.

The controller 710 can also include a system event log controller and/or storage for managing and maintaining events, alerts, and notifications received by the controller 710. For example, the controller 710 or a system event log controller can receive alerts or notifications from one or more devices and components, and maintain the alerts or notifications in a system event log storage component.

Flash memory 732 can be an electronic non-volatile computer storage medium or chip that can be used by the system 700 for storage and/or data transfer. The flash memory 732 can be electrically erased and/or reprogrammed. Flash memory 732 can include EPROM (erasable programmable read-only memory), EEPROM (electrically erasable programmable read-only memory), ROM, NVRAM, or CMOS (complementary metal-oxide semiconductor), for example. The flash memory 732 can store the firmware 734 executed by the system 700 when the system 700 is first powered on, along with a set of configurations specified for the firmware 734. The flash memory 732 can also store configurations used by the firmware 734.

The firmware 734 can include a Basic Input/Output System or equivalents, such as an EFI (Extensible Firmware Interface) or UEFI (Unified Extensible Firmware Interface). The firmware 734 can be loaded and executed as a sequence program each time the system 700 is started. The firmware 734 can recognize, initialize, and test hardware present in the system 700 based on the set of configurations. The firmware 734 can perform a self-test, such as a POST (Power-on-Self-Test), on the system 700. This self-test can test the functionality of various hardware components such as hard disk drives, optical reading devices, cooling devices, memory modules, expansion cards, and the like. The firmware 734 can address and allocate an area in the memory 704, ROM 706, RAM 708, and/or storage device 712, to store an operating system (OS). The firmware 734 can load a boot loader and/or OS, and give control of the system 700 to the OS.

The firmware 734 of the system 700 can include a firmware configuration that defines how the firmware 734 controls various hardware components in the system 700. The firmware configuration can determine the order in which the various hardware components in the system 700 are started. The firmware 734 can provide an interface, such as an UEFI, that allows a variety of different parameters to be set, which can be different from parameters in a firmware default configuration. For example, a user (e.g., an administrator) can use the firmware 734 to specify clock and bus speeds; define what peripherals are attached to the system 700; set monitoring of health (e.g., fan speeds and CPU temperature limits); and/or provide a variety of other parameters that affect overall performance and power usage of the system 700. While firmware 734 is illustrated as being stored in the flash memory 732, one of ordinary skill in the art will readily recognize that the firmware 734 can be stored in other memory components, such as memory 704 or ROM 706.

System 700 can include one or more sensors 726. The one or more sensors 726 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 726 can communicate with the processor, cache 728, flash memory 732, communications interface 724, memory 704, ROM 706, RAM 708, controller 710, and storage device 712, via the bus 702, for example. The one or more sensors 726 can also communicate with other components in the system via one or more different means, such as inter-integrated circuit (I2C), general purpose output (GPO), and the like. Different types of sensors (e.g., sensors 726) on the system 700 can also report to the controller 710 on parameters, such as cooling fan speeds, power status, operating system (OS) status, hardware status, and so forth. A display 636 may be used by the system 600 to provide graphics related to the applications that are executed by the controller 610.

Figure 8:
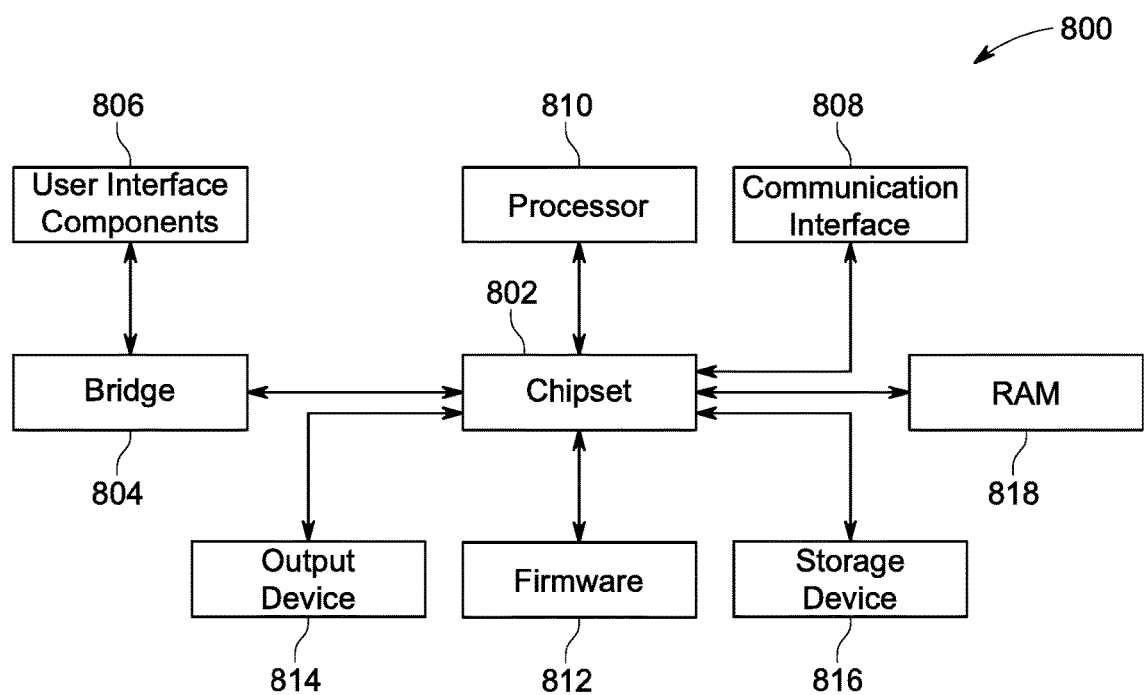

FIG. 8 illustrates an example computer system 800 having a chipset architecture that can be used in executing the described method(s) or operations, and generating and displaying a graphical user interface (GUI). Computer system 800 can include computer hardware, software, and firmware that can be used to implement the disclosed technology. System 800 can include a processor 810, representative of a variety of physically and/or logically distinct resources capable of executing software, firmware, and hardware configured to perform identified computations. Processor 810 can communicate with a chipset 802 that can control input to and output from processor 810. In this example, chipset 802 outputs information to output device 814, such as a display, and can read and write information to storage device 816. The storage device 816 can include magnetic media, and solid state media, for example. Chipset 802 can also read data from and write data to RAM 818. A bridge 804 for interfacing with a variety of user interface components 806, can be provided for interfacing with chipset 802. User interface components 806 can include a keyboard, a microphone, touch detection and processing circuitry, and a pointing device, such as a mouse.

Chipset 802 can also interface with one or more communication interfaces 808 that can have different physical interfaces. Such communication interfaces can include interfaces for wired and wireless local area networks, for broadband wireless networks, and for personal area networks. Further, the machine can receive inputs from a user via user interface components 806, and execute appropriate functions, such as browsing functions by interpreting these inputs using processor 810.

Moreover, chipset 802 can also communicate with firmware 812, which can be executed by the computer system 800 when powering on. The firmware 812 can recognize, initialize, and test hardware present in the computer system 800 based on a set of firmware configurations. The firmware 812 can perform a self-test, such as a POST, on the system 800. The self-test can test the functionality of the various hardware components 802-818. The firmware 812 can address and allocate an area in the memory 818 to store an OS. The firmware 812 can load a boot loader and/or OS, and give control of the system 800 to the OS. In some cases, the firmware 812 can communicate with the hardware components 802-810 and 814-818. Here, the firmware 812 can communicate with the hardware components 802-810 and 814-818 through the chipset 802, and/or through one or more other components. In some cases, the firmware 812 can communicate directly with the hardware components 802-810 and 814-818.

It can be appreciated that example systems 700 and 800 can have more than one processor (e.g., 730, 810), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a", "an" and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method of determining a fanout configuration of a port of network switch coupled to a network node, the method comprising:
   discovering the network node coupled to the port of the network switch;
   determining a plurality of fanout modes for the port;
   configuring the port with one of the plurality of fanout modes;
   retrieving a port speed of a network interface card of the network node;

comparing the retrieved port speed to a stored port speed; and setting a maximum speed to the retrieved port speed if the retrieved port speed is greater than the stored port speed.

2. The method of claim 1, further comprising storing the configured fanout mode and the associated port in a memory.

3. The method of claim 1, wherein a management node is coupled to the network switch and the network node, and wherein the management node:

retrieves a network interface card identity from the network node;

queries the network switch to match a second port having a neighbor identity matching the identity of the network node; and retrieves the maximum speed of the second port.

4. The method of claim 1, wherein a management node is coupled to the network switch and the network node, and wherein the management node initiates the determination and configuration of the port fanout mode.

5. The method of claim 1, wherein a switch agent performs the determination and configuration of the fanout mode for the port.

6. The method of claim 5, wherein the switch agent is external from the network switch.

7. A method to determine the operating speed of a network interface card of a network node coupled to a first port of a network switch, the method comprising:

storing the operating speed of the network interface card of the network node;

retrieving an identity of the network interface card from a second network node coupled to a second port of the network switch, wherein the second network node is a neighbor of the network node;

matching the identity of the network interface card with neighbor information of the second network node; and retrieving the operating speed of the network node based on the matched identity.

8. The method of claim 7, wherein the operating speed of the nodes connected to the first port is retrieved periodically by a switch agent, and wherein the retrieved operating speed is compared with the stored operating speed of the node, and wherein the retrieved operating speed is stored if the retrieved operating speed is greater than the stored operating speed.

9. A network system comprising:

a switch having a port having a plurality of fanout modes;

a network node coupled to the port; and a switch agent operable to periodically determine the fanout modes of the port and configure the port for one of the fanout modes, wherein the switch agent is further operable to retrieve a port speed of a network interface card of the node, compare the retrieved port speed to a stored port speed, and set a maximum speed to the retrieved port speed if the retrieved port speed is greater than the stored port speed.

10. The network system of claim 9, further comprising a memory storing the configured fanout mode and the associated port.

11. The network system of claim 9, further comprising a management node coupled to the switch and the network node, the management node operable to initiate the periodic determination of the fanout mode and the configuration of the fanout mode.

12. The network system of claim 9, further comprising a management node coupled to the switch and the network node, the management node operable to:

retrieve an identity of the network interface card of the network node, query the switch to identify a second port having a neighbor identity matching the identity of the network node, and retrieve the maximum speed of the second port.

13. The network system of claim 9, wherein the switch agent is external to the network switch.

* * * * *